United States Patent Office 2,795,628
Patented June 11, 1957

2,795,628
PREPARATION OF PHENYL MAGNESIUM CHLORIDE

Hugh E. Ramsden, Metuchen, N. J., assignor to Metal & Thermit Corporation, New York, N. Y., a corporation of New Jersey No Drawing. Application May 12, 1954,
Serial No. 429,397

6 Claims. (Cl. 260—665)

The present invention relates to a process of preparing phenyl magnesium chloride.

Although phenyl magnesium bromide has heretofore been known and used as a reagent, its high cost has rendered its use non-attractive. Consequently, it was once belived that phenyl magnesium chloride could be prepared more economically, thereby yielding a more desirable reagent. However, because of the extreme inertness of the aromatic chloride, the usual methods of preparing Grignard reagents in ether using chlorobenzene as a reactant were unsuccessful for the preparation of phenyl magnesium chloride. In the past, resort was made to extreme conditions of high temperature and pressure for a long period but even under these conditions, disappointing yields are obtained. Such processes were objectionable, not only because of the poor yields of the desired reagent, but also because of the formation of tars as by-products which were difficult to remove.

It is an object of the present invention economically to prepare phenyl magnesium chloride in high yield and purity by reacting sulfur-free chlorobenzene with magnesium at reflux temperatures of about 130–135° C. and preferably 130–132° C.

It has been found that commercial chlorobenzene contains a small amount, on the order of about 0.2% of a sulfur impurity. This sulfur impurity, believed to be chlorothiophene, since commercial chlorobenzene is usually manufactured from industrial coal tar benzene, inhibits the reactivity of chlorobenzene. Consequently, the presence of a catalyst has heretofore been required in the preparation of phenyl magnesium chloride to overcome this inhibiting action. When chlorobenzene has substantially more than .2% chlorothiophene, the inhibiting action is so great as to completely inactivate the chlorobenzene-magnesium reaction even in the presence of catalysts.

The sulfur impurities may be removed from chlorobenzene by washing with sulfuric acid to produce an active reagent, or by other means.

The magnesium samples utilized in the present invention are standard commercial products, and need not necessarily possess a clean, unoxidized surface; they may be old and dirty. The magnesium may be in the form of turnings (resulting from milling) granular material (produced on a hammer-mill), or in other comminuted forms.

A preferred embodiment of the invention resides in the maintenance of anhydrous reaction conditions. While a small quantity of water will not deter the reaction, better yields are obtained when anhydrous conditions are maintained.

A feature of the present invention is the utilization of reflux temperatures of about 130–135° C. and preferably 130–132° C. at atmospheric pressure. This temperature range overcomes the disadvantages arising from the prior methods wherein superatmospheric pressures and higher temperatures were employed. The violent reaction which could ensue as a result of such severe conditions resulted in charring and in the formation of tars. With the present process the reaction between chlorobenzene and magnesium is easily controlled. The non-exothermicity of this reaction, renders it necessary to apply heat in order to obtain reaction. It is possible by merely withdrawing the heat source to halt the reaction for a period of time, after which further application of heat will permit the reaction to continue. As about ten to twenty hours is necessary in order to obtain complete reaction between the magnesium and chlorobenzene, the removal of the heating permits halting of the reaction when desired and its resumption at a future time.

Another embodiment of the present process resides in the advantageous use of a diluent or solvent during the reaction. It has been found that in the absence of a diluent, the reaction mixture becomes so viscous as to inhibit further reaction. It has also been found that charring may occur when no diluent is present during the reaction. This solvent may be present at the beginning of the reaction or may be added to the reaction mixture at any time after initiation of the reaction but before it has become unduly viscous. In view of the variety of diluents useful herein, the last possible time for addition of the diluent and the quantities thereof must be determined separately for each material by simply observing the consistency of the mixture as the reaction progresses. Suitable solvents or diluents include chlorobenzene, benzene, toluene, xylene, phenyl ether, mixtures thereof and the like. If more than one mole of chlorobenzene per g. atom of magnesium is present in the reaction mixture, the excess chlorobenzene acts as a diluent and no other solvent need be added.

Another preferred embodiment of the present invention resides in carrying out the reaction under an inert atmosphere. Although this is not essential in the present process, the exclusion of air and its displacement by, for instance, nitrogen results in a shorter initiation period. Other inert gases include helium, argon, neon and krypton. By initiation period is meant the time from the beginning of reflux to the time the reaction actually commences. This period can generally vary over a range of twenty-five minutes to about 3 hours and fifteen minutes. However, when this reaction is carried out under an inert atmosphere, an initiation period of only about twenty minutes is observed. Another deleterious effect of the oxygen in the air on the reagent is the formation of phenols as a result of air oxidation. Thus, while a nitrogen atmosphere is not essential in the instant process, it does provide additional advantages in the obtention of phenyl magnesium chloride in high yields and purity.

Still another embodiment of the invention resides in efficient agitation of the reaction mixture. It has been found that stirring is essential to the obtention of a high yield of a pure product. The absence of agitation may result in charring, a considerably longer initiation period, and, consequently, a less economical process. The degree of agitation, namely, the speed of the stirrer, affects the rapidity of the reaction. More specifically, rapid agitation on the order of 10,000 R. P. M. causes the reaction to be complete three hours after reflux started (130° C.), whereas slow stirring, on the order of 100–200 R. P. M., may require 20 hours after reflux starts for completion. Furthermore, with rapid agitation the reaction commences before reflux temperatures of about 130° C. are reached, reaction being noted at 110° C.–118° C. Rapid agitation reduces the reaction period and is advantageous where rapidity of reaction is a desirable feature, but it is not essential in the present invention.

The phenyl magnesium chloride yields obtained by the process range from 80% to 95% based on the weight of magnesium as compared to prior processes wherein a maximum of only 50% by weight of the magnesium has been obtained. This process affords a considerable saving, rendering the present process a superior procedure for the manufacture of the phenyl magnesium chloride reagent. In addition, initiation of the reaction between magnesium and chlorobenzene is brought about uniformly in twenty-five minutes to three hours and fifteen minutes instead of the usual lengthy period of sulfur-free chlorobenzene.

The following examples are further illustrative of the present invention, and it will be understood that the invention is not limited thereto:

Example 1

One g. atom of magnesium turnings and 1.0 mole of sulfur-free chlorobenzene * were charged into a one liter, 3-necked flask equipped with a stainless steel anchor stirrer, reflux condenser topped by a drying tube of $CaSO_4$, a thermometer, and a Glas-col heater. All joints were glass. This mixture was stirred and heated to reflux. Two hours after reflux began, a greenish color developed in the mix indicating that the reaction had started. Four additional moles of chlorobenzene were added to the reaction mixture five minutes after initiation of the reaction. Heating was continued for 18 hours. The mixture was cooled, diluted with anhydrous ethyl ether, and made up to one liter of solution in a volumetric flask by addition of more ether. The solution was shaken to disperse solids, allowed to settle for a moment, and a 20 ml. sample was pipetted into a 500 ml. Erlenmeyer flask containing 50 ml. water and 50 ml. of 0.5 N $H_2SO_4$. The whole mixture was heated on a steam bath for thirty minutes. 1.5 ml. of 0.04% bromocresol purple was used as an indicator for the back-titration with 0.2 N NaOH solution and the yield was calculated. This is the well known Gilman titration, somewhat modified. The yield for this run based on the titration was 80.1%.

The following table represents additional Examples 2-22 inclusive, of the present invention, wherein the apparatus, procedure and ingredients of Example 1 were utilized except as specified in the table. The percentage of 2-chlorothiophene present in the chlorobenzene, and the effect of its presence on the initiation time, reaction time and yield are indicated in the following table. The conditions of reaction for each experiment were varied by subjecting the reaction mixture to differing reaction times as shown in the table. By initiation time is meant the time from the beginning of reflux, which is at about 130° C., until the reaction starts as evidenced by the development of a green color. By reaction time is meant the total time of refluxing of the reaction mixture after the reaction has started (i. e., time of reaction after initiation thereof). Other conditions that were varied during the reaction between the magnesium and chlorobenzene appear under the heading "Remarks." The yield of the final reaction product, phenyl magnesium chloride, was determined as in Example I, and was based on the magnesium content.

| Example | Percent 2-chlorothiophene in chlorobenzene | Initiation time hrs. | Initiation time min. | Reaction time hrs. | Reaction time min. | Remarks | Percent Yield |
|---|---|---|---|---|---|---|---|
| 1 | 0 | 2 | | 18 | | | 80.1 |
| 2 | 10 | no reaction after twenty hrs. refluxing. | | | | | |
| 3 | 2 | | | same | | | |
| 4 | 1 | | | same | | | |
| 5 | 0 | | | 25 | 20 | distilled¹ chlorobenzene, N₂ atmosphere, silicone grease present in apparatus acts as a catalyst. | 88.1 |
| 6 | 0.1 | 1 | 5 | 20 | | Same | 90.0 |
| 7 | 0.2 | 1 | 55 | 20 | | Same | 90.9 |
| 8 | 0.3 | no reaction after 10 hrs. reflux | | | | Same | |
| 9 | 0.4 | | | Same | | Same | |
| 10 | 0.5 | | | Same | | Same | |
| 11-15 | 0.6-1.0 | | | Same | | Same | |
| 16 | 0 | 3 | 15 | 20 | | distilled¹ chlorobenzene, no silicone present (Vaseline substituted). | 77.0 |
| 17 | 0.2 | no reaction after 30 hrs. reflux | | | | Same | |
| 18 | 0.18 | 17 | 30 | 20 | | untreated chlorobenzene, no silicone present (Vaseline substituted). | 81.1 |
| 19 | 0.18 | | | 15 | 20 | untreated chlorobenzene, silicones present. | 88.1 |
| 20 | 0 | 1 | 2 | 20 | | freshly distilled chlorobenzene, no stirring, silicone grease, no diluent. | (²) |
| 21 | 0 | | | 57 | 20 | fractionated chlorobenzene, apparatus washed to remove silicone grease and Vaseline substituted therefor. | 94.5 |
| 22 | 0 | 2 | | 20 | | fractionated chlorobenzene. | 94.5 |

¹ Commercial chlorobenzene was washed free of thiophene compounds with concentrated sulfuric acid, washed free of sulfuric acid, dried and distilled.
² Final product was a viscous orange material. Charring was severe enough to prevent a determination of the yield.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. A method of preparing phenylmagnesium chloride Grignard reagent, which consists in reacting a commercial grade magnesium having an oxidized surface with sulfur-free chlorobenzene at reflux temperatures.

2. A method according to claim 1, wherein the reflux temperatures are in the range of about 130–135° C.

3. A method according to claim 2, wherein the reaction is carried out under atmospheric pressure.

4. A method according to claim 3, wherein the reaction is carried out in an inert atmosphere.

5. A method according to claim 1 including recovering said phenylmagnesium chloride.

6. A method of preparing phenylmagnesium chloride Grignard reagent which consists in refluxing a mixture consisting of about equal molar quantities of commercial grade magnesium having an oxidized surface and sulfur-free chlorobenzene to initiate the reaction, adding to said initiated mixture sufficient excess chlorobenzene to pro-

* Commercial chlorobenzene was washed with cold concentrated sulfuric acid until no color developed in the sulfuric acid, and was then fractionated.

vide a reaction medium for the reaction, and refluxing the mixture so formed to complete the reaction.

References Cited in the file of this patent

UNITED STATES PATENTS

| | | |
|---|---|---|
| 2,056,822 | Britton et al. | Oct. 6, 1936 |
| 2,058,373 | Weissenborn | Oct. 20, 1936 |
| 2,462,391 | Hartough et al. | Feb. 22, 1949 |
| 2,552,676 | Hill | May 15, 1951 |

OTHER REFERENCES

Gilman et al.: Recueil-Travaux Chimiques des Pays-Bas, vol. 48 (1929), pages 160–162, page 161 only relied on.